April 11, 1967     F. S. BECKERER     3,313,009
SPRING CLIP
Filed March 12, 1965
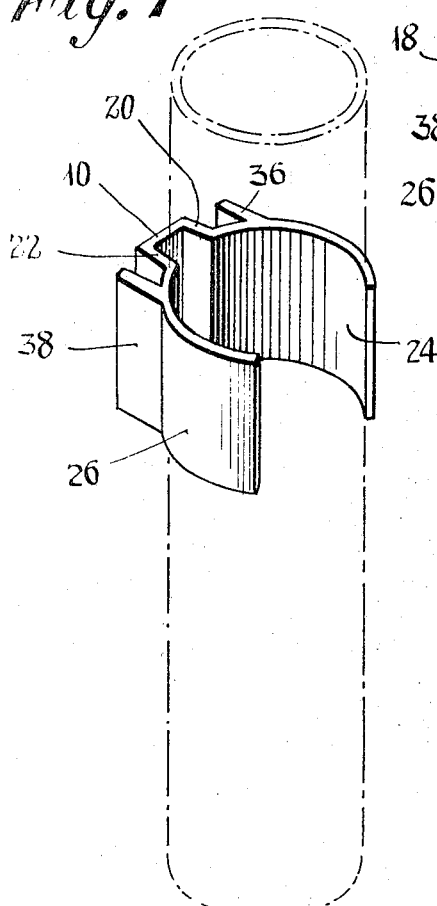
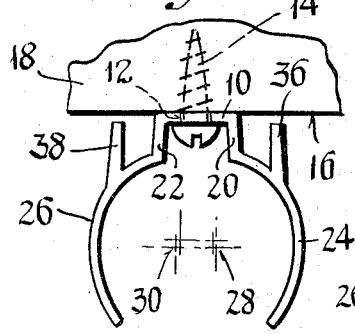
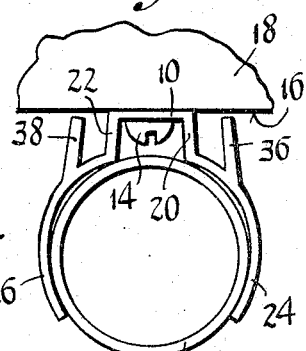
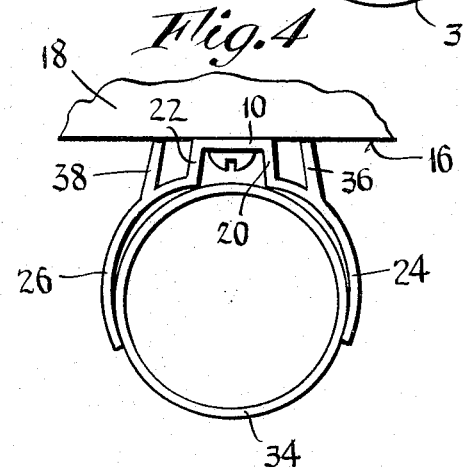
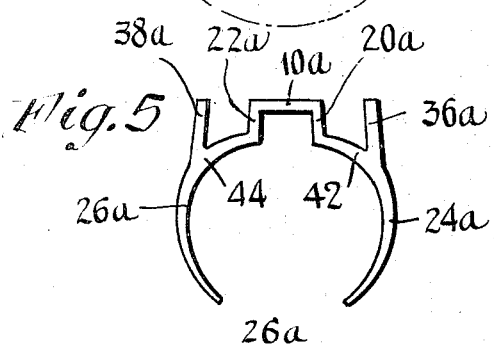
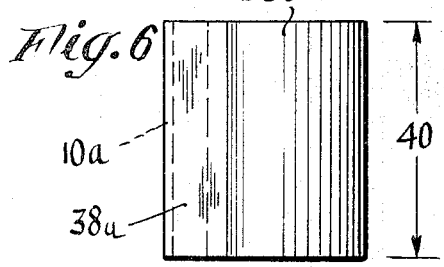
INVENTOR.
Frank S. Beckerer
BY
H. Gibner Lehmann
AGENT

United States Patent Office 3,313,009
Patented Apr. 11, 1967

3,313,009
SPRING CLIP
Frank S. Beckerer, Easton, Conn., assignor to Beckson Manufacturing, Inc., Bridgeport, Conn., a corporation of Connecticut
Filed Mar. 12, 1965, Ser. No. 439,267
3 Claims. (Cl. 24—257)

This invention relates to spring clips, and more particularly to substantially U-shaped clips which are attachable to a supporting surface to enable various articles to be removably supported thereon.

An object of the invention is to provide a novel and improved spring clip which is characterized by a simplified backing or reinforcing means for the clip arms and, in one embodiment, by dual pressure-ranges one or the other of which is automatically brought into play depending on the size of the article being supported.

Another object of the invention is to provide an improved spring clip as above set forth, which is constituted entirely of one piece of material and which effects the dual pressure-range by the use of integral backing or strut formations.

A further object of the invention is to provide an improved clip in accordance with the foregoing, which may be readily and advantageously fabricated of plastic substance, using high production techniques such as plastic extrusion processes or the like.

A feature of the invention resides in the provision of a novel spring clip construction as indicated, which is extremely simple in its formation, economical to fabricate, effective and reliable in use, and adaptable to a wide variety of sizes of articles intended to be supported.

Other features and advantages will hereinafter appear.

In the drawings accompanying this specification, similar characters of reference have been used to designate like components throughout the several views, in which:

FIG. 1 is a perspective view of the improved spring clip constituted of plastic substance as provided by the invention, this figure also showing in dotted outline a tubular member being supported by the clip.

FIG. 2 is a top plan view of the clip being carried on a supporting surface, a portion only of the supporting member being illustrated.

FIG. 3 is a view similar to that of FIG. 2, and showing the clip holding or carrying a cylindrical member of nominal diameter.

FIG. 4 is a view like that of FIGS. 2 and 3, but showing the clip supporting a cylindrical member of larger diameter.

FIG. 5 is a top plan view of a clip illustrating a modification made according to the invention, and FIG. 6 is a side elevational view of the clip of FIG. 5.

Referring first to FIGS. 1–4, the one-piece, entirely integral plastic clip illustrated therein comprises a central, generally flat base or yoke portion 10 having a pair of through holes 12 to accommodate fastening screws 14 by which the clip may be secured to a supporting surface 16 of a support member 18.

The base portion 10 is generally of rectangular configuration, and may include forwardly extending planar portions or side flanges 20, 22 joined to its opposite side edges, thereby to provide a channel formation which is U-shaped in cross section.

The spring clip illustrated herein may, in accordance with the invention, be formed of separate pieces secured together in assembled relation. However, it is preferred to form the clip with all portions integral with each other, preferably as a plastic extrusion product constituted of polyvinyl chloride or similar tough, resilient, and rigid plastic formulation.

Joined to the two side flanges or planar portions 20, 22 are two curved wings or clip arms 24, 26 respectively, said arms having an arcuate shape and preferably constituting portions of a cylinder the centers of which are not coincidental but instead spaced apart a slight distance. As seen in FIG. 2, the ear 24 may have a center of curvature at the location 28, and the ear 26 may have a center of curvature at the location 30. The flanges 20, 22 may be considered as either parts of the base portion 10 or else parts of the clip arms 24, 26 as will be understood. It will be apparent that by the construction as thus far described the clip is capable of receiving and supporting members 32, 34 of tubular or circular shape readily, as seen in FIGS. 3 and 4.

In accordance with the present invention, the spring clip has a simplified backing or reinforcing means for the clip arms 24, 26 and in the embodiment of FIGS. 1–4 a dual range of pressures which are respectively brought into play depending upon the diametric size of the object which is being held or supported. For example, in connection with this latter, when the clip is supporting an object 32 having a somewhat smaller diameter as shown in FIG. 3, a lesser range of pressures comes into play, these being considered adequate for smaller objects which are normally thought of as being lighter in weight.

However, where large-diameter objects are supported, as for example the object 34 illustrated in FIG. 4, the clip will operate with a higher pressure range than with the smaller object 32 of FIG. 3. That is, greater gripping pressures will be exerted by the clip when holding the larger diameter object 34, these pressures being appreciably more than those which would normally result from merely a greater stressing or flexing of the clip arms or base from the original positions.

In effecting this, the invention provides on the clip arms 24, 26 a pair of rearwardly extending planar portions or projections 36, 38 respectively. The projections 36, 38 are also preferably integral with the other portions of the clip, and may be formed by the extrusion die at the time that the blank or stock material is being extruded therefrom.

Normally, when the clip of FIGS. 1–4 is not supporting any object or when it is supporting only smaller-diameter objects as in FIGS. 2 and 3, the projections 36, 38 are free of the support surface 16 and supporting member 18. FIGS. 2 and 3 show in exaggerated form a clearance space between the supporting surface 16 on the one hand and the rearwardly extending projections 36, 38 on the other hand. The said projections, however, are so constituted as to be brought into engagement with the supporting member 18 at such time that the clip is called upon to support an object of larger diameter. This is illustrated in FIG. 4. By such engagement of the projections 36, 38 with the support member 18 a backing-up action is provided for the clip arms 24, 26. In consequence, a reinforcement is effected, and dependence is not had solely on those portions of the clip arms which are located between the projections 36, 38 and the side flanges 20, 22 as well as on the flanges themselves. Instead, the engagement of the projections 36, 38 with the support member 18 will reinforce the action of the flanges 20, 22 and adjoining portions of the clip arms, and will tend to shorten the effective flexing portions of the arms to those areas which are located forwardly of the projections or lugs. As a consequence, more powerful pressures are exerted against the large diameter object 34 (beyond those which would be obtainable just from the greater flexing of the side flanges 20, 22 and adjoining portions of the arms). Because of this, the larger-diameter object 34 may be considerably heavier than the small-diameter object 32 and still be adequately supported by the clip construction.

It will be understood that in all circumstances the base portion 10 of the clip will be securely rigidly fastened against the support member 18 and will experience no appreciable flexing or movement with respect thereto.

A modification of the invention is illustrated in FIGS. 5 and 6. In these figures there is shown a clip having a greater height than the clip of FIGS. 1–4. Because of the extruded nature of the blank or stock material, clips of any desired height are readily obtained by merely cutting off longer portions of the extruded stock. Thus, the height 40 of the clip of FIGS. 5 and 6 may be twice that of the clip of FIGS. 1–4, or three times that, or any desired practical dimension. The greater the length of the clip, the more secure will be the holding action, since a greater total pressure is brought to bear on the object which is being held.

In FIGS. 5 and 6 the clip arms 24a, 26a are shown as having thicker sections or portions 42, 44 at the areas where the rearwardly extended lugs 36a, 38a join. Also the lugs 36a, 38a are shown in FIGS. 5 and 6 as being somewhat longer than the lugs 36, 38 of the first-described construction, the increased length being sufficient to enable them to engage at all times the supporting surface to which the clip is attached. Otherwise, the clip of FIGS. 5 and 6 is similar to that of FIGS. 1–4, as regards the backing-up or reinforcement action of the rearwardly extended lugs 36a, 38a. In consequence, reliance is not had solely on the flexure of the side flanges 20a, 22a and adjoining portions of the clip arms but instead the engagement of the rearwardly extended lugs 36a, 38a with the supporting surface provides a more rigid, stiffer and stronger gripping action.

Aside from the above-mentioned stiffening action provided by the rearwardly extending lugs or projections 36, 38 or 36a, 38a there is another important advantage which may be attributed to these lugs.

In the case of both plastic and metal, there is always the likelihood that abusive use of the clip will result in stretching or deformation beyond the recovery point. With sheet metal articles this usually is not so serious unless the metal is actually cracked or split. If a metal arm is forced past its recovery point, it can often be merely bent back to the original shape, whereupon the clip will again serve the desired purpose. Of course, if the clip is made of case-hardened steel, or oil-quenched steel or the like, the forcing of the arms beyond the recovery point will usually result in the metal cracking, rendering the clip useless.

In the case of a plastic clip such as set forth in this specification, the danger points when considering excessive stretching or spreading apart of the arm, would be the two corner portions of the base, referring to FIGS. 2 and 3. This is the place most likely to crack or fail, or else to stretch beyond the recovery point. However, by the provision of the rearward extending lugs 36, 38, or 36a, 38a, such permanent deformation of the clip arms is prevented, for as seen in FIG. 4 of the drawings, prior to the plastic substance being stretched beyond the recovery point at the corners between the portions 10, 20 and 22, engagement will occur between the lugs 36, 38 and the supporting member 16, 18. Such engagement will now take care of the additional reactive forces, so that these will not be imposed at the corners of the base 10 upon further spreading of the arms. Instead, the arms themselves forwardly of the lug 36, 38 will take up the resistive forces. By virtue of this action there is avoided failure of the clip at the corners of the base 10, or deformation beyond the recovery point whereby the clip would be rendered useless. Instead, the provision of the lugs 36, 38 enables the clip to withstand much greater spreading forces in use, without the danger or likelihood of failure or malfunctioning. Accordingly, the provision of the rearwardly extending lugs is of special importance when considering clips fabricated of plastic substance.

It will now be understood from the foregoing that I have provided an improved and simplified one-piece clip construction having a number of advantageous features. The clip construction may be cut from extruded blank or stock material, which is readily formed of rigid polyvinyl chloride or equivalent plastic substance. In consequence, a desirable economy of manufacture is had. When made of corrosion resistant plastic substance the clip will not rust or be eaten away under the action of salt water, acids or the like and accordingly will be durable and capable of a long and useful period of service. The clip is light in weight while at the same time providing the necessary strength and gripping action to adequately support the desired articles. The clip may be easily and quickly secured to the supporting surfaces, and presents a neat and attractive appearance. No extensive finishing operations are required, and the clip will not mar or scratch the finish of objects which are being held.

Variations and modifications may be made within the scope of the claims, and portions of the improvement may be used without others.

I claim:

1. A releasing type holder construction for objects, said construction comprising a generally flat wall member and a dual-pressure range, one-piece spring clip of resilient substance carried by said wall member, said spring clip comprising, in combination:
    (a) a central base portion defining a planar rear surface engaged with said wall member,
    (b) means rigidly securing said base portion to the wall member against all movement with respect thereto,
    (c) a pair of resilient clip arms extending forward from opposite edges of the base, said arms being in opposed relation, defining between them a space and being adapted to embrace between them and in said space an object which is to be held with the axis of the object extending substantially midway of and parallel to the engaged surfaces of the arms, and
    (d) reinforcing projections extending rearward from the clip arms at points thereon spaced from the base, said projections being so formed as to have rear extremities normally disposed appreciably forward of the plane of said wall member and which are adapted to engage the wall member only when the arms are under appreciable flexure while supporting between them the object to be held, said projections thereby backing-up and stiffening the clip arms to enable them to more securely hold the object and minimize failure of the clip.

2. A spring clip as in claim 1, wherein:
    (a) said base portion, clip arms and reinforcing projections are coextensive with each other measured parallel to the said axis of the held object constituting different parts of an extrusion.

3. A releasing type holder construction for objects, said construction comprising a generally flat wall member and a dual-pressure range, one-piece spring clip of resilient substance carried by said wall member, said spring clip comprising, in combination:
    (a) a central base portion defining a planar rear surface engaged with said wall member,
    (b) means rigidly securing said base portion to the wall member against all movement with respect thereto,
    (c) a pair of resilient clip arms extending forward from opposite edges of the base, said arms being in opposed relation and being adapted to embrace between them an object which is to be held, and (d) reinforcing projections extending rearward from the clip arms at points thereon spaced from the base, said projections having rear extremities which are disposed appreciably forward of the plane defined by said wall member and said projections shifting rearward when the arms are flexed apart by the object to be held, thereby to locate the said rear extremities in the said plane for effecting engagement with the wall member whereby the arms are backed-up and stiffened so as to more securely hold the object.

References Cited by the Examiner

UNITED STATES PATENTS

| | | |
|---|---|---|
| 2,494,881 | 1/1950 | Kost. |
| 2,963,761 | 12/1960 | Haydock _____ 24—257 |
| 2,979,554 | 4/1961 | Maitland _____ 248—316 XR |
| 3,135,488 | 6/1964 | Leonard _____ 248—50 |
| 3,163,391 | 12/1964 | Adams. |

WILLIAM FELDMAN, *Primary Examiner.*

DONALD A. GRIFFIN, *Examiner.*